March 10, 1964     S. THALER     3,124,792
ELECTRONIC SELECTION CIRCUIT

Filed Aug. 3, 1960     2 Sheets-Sheet 1

INVENTOR.

BY SHERWOOD THALER

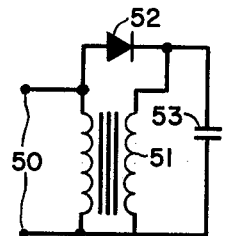
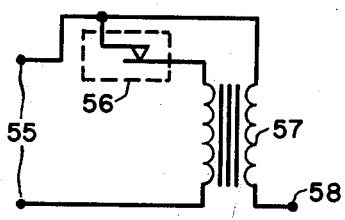
FIG. 3.   FIG. 4.
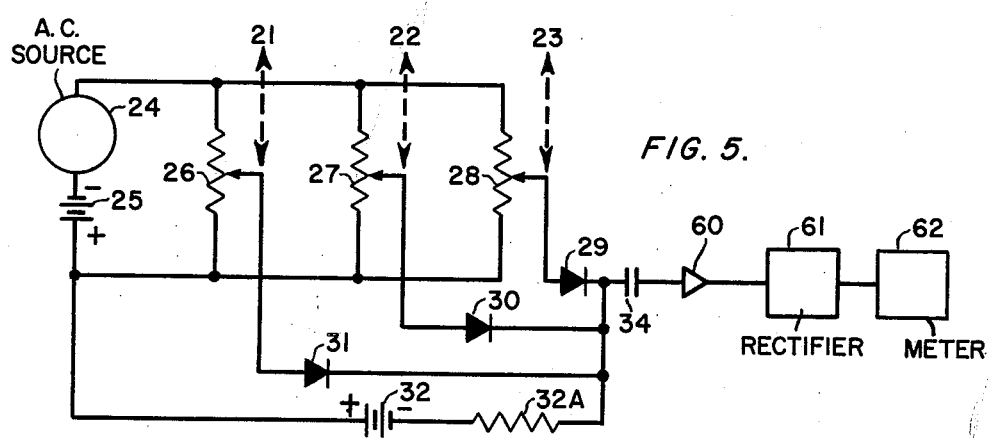
FIG. 5.
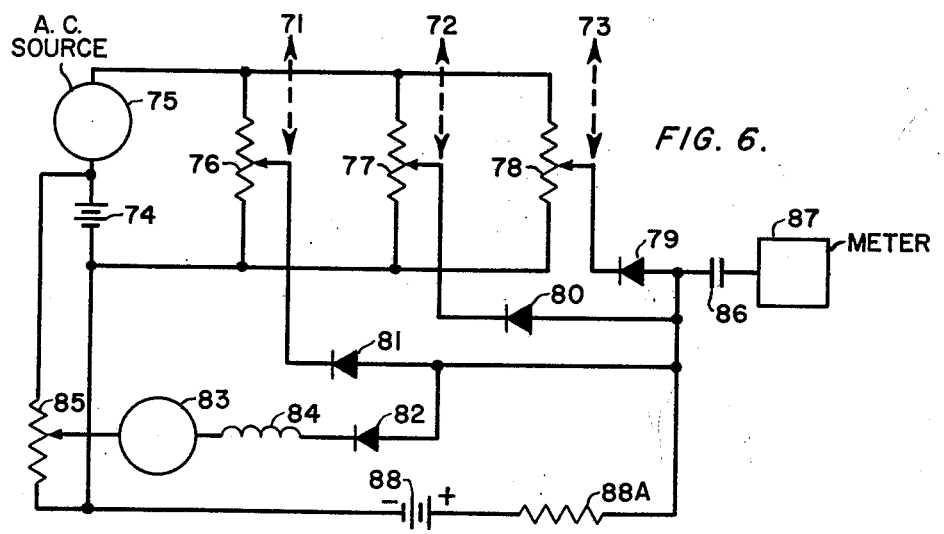
FIG. 6.
INVENTOR.
BY SHERWOOD THALER United States Patent Office 3,124,792
Patented Mar. 10, 1964

3,124,792
ELECTRONIC SELECTION CIRCUIT
Sherwood Thaler, Stamford, Conn., assignor to Simmonds Precision Products, Inc., Tarrytown, N.Y., a corporation of New York
Filed Aug. 3, 1960, Ser. No. 47,190
5 Claims. (Cl. 340—179)

This invention relates to electronic circuitry for determining or selecting the highest of a plurality of electrical representations of certain parameters and also for determining or selecting the lowest of a plurality of electrical representations of certain parameters. In the past electronic scanning circuits have used such components as magnetic cores which establish greater costs and contain lesser accuracy. In addition, mechanical scanning circuits suffer from low reliability, short life and are inherently sequential in operation. Such scanning circuits have also used circuits whereby the detecting means incorporate a loss of signal which also introduces error. In the present invention these disadvantages have been eliminated thereby resulting in a more economical and more accurate arrangement.

One typical application for such a scanning circuit would be to determine the highest oil temperature in several different engines in an aircraft by an electronic selection circuit. Another typical application would be to measure the lowest oil pressure at a number of different locations by an electronic selection circuit.

An object of this invention is to greatly reduce the number of indicators necessary in an installation having a plurality of sensors.

Another object is to provide an improved electronic selection circuit for determining the minimum and maximum outputs of a number of sensors.

A still further object is to provide a more accurate and efficient selection circuit for determining the range and quantity of one of a plurality of signals.

In accordance with an embodiment of this invention a signal receiving means operates the diode matrix and a signal selection means transmits the maximum or minimum signal depending upon the circuit configuration used.

In the following discussion the circuit that selects the maximum signal of a plurality of input signals will be described. A variation of this circuit will allow the selection of a minimum of a plurality of input signals.

The foregoing and other objects, the advantages and novel features of this invention may be best understood from the following description when read in connection with the accompanying drawing, in which like reference numerals refer to like parts, and in which:

FIGURE 3 is a schematic of an input rectifier circuit which allows operation on a pure A.C. input.

FIGURE 4 is a schematic of an input chopper circuit which allows operation on a pure D.C. input.

FIGURE 5 is a block diagram of a non-servo indicating device which can be used to measure the output of the scanning system.

FIGURE 6 is a schematic diagram of another variation of the electronic scanning circuit.

Figure 1:
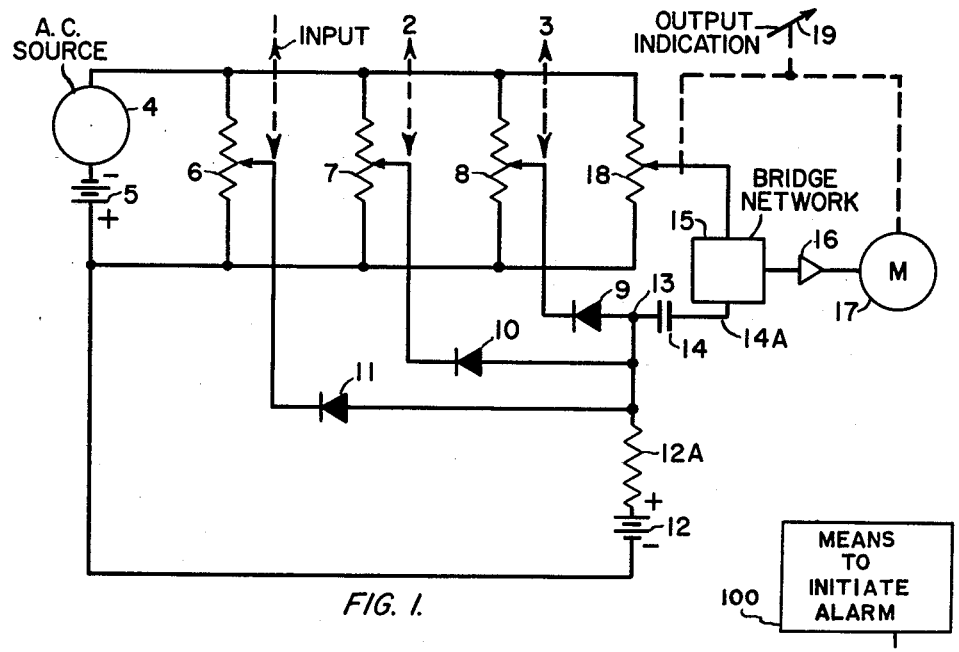
FIGURE 1 is a schematic diagram of a circuit embodying this invention to determine a maximum of a plurality of signals in a scanning system.
Figure 2:
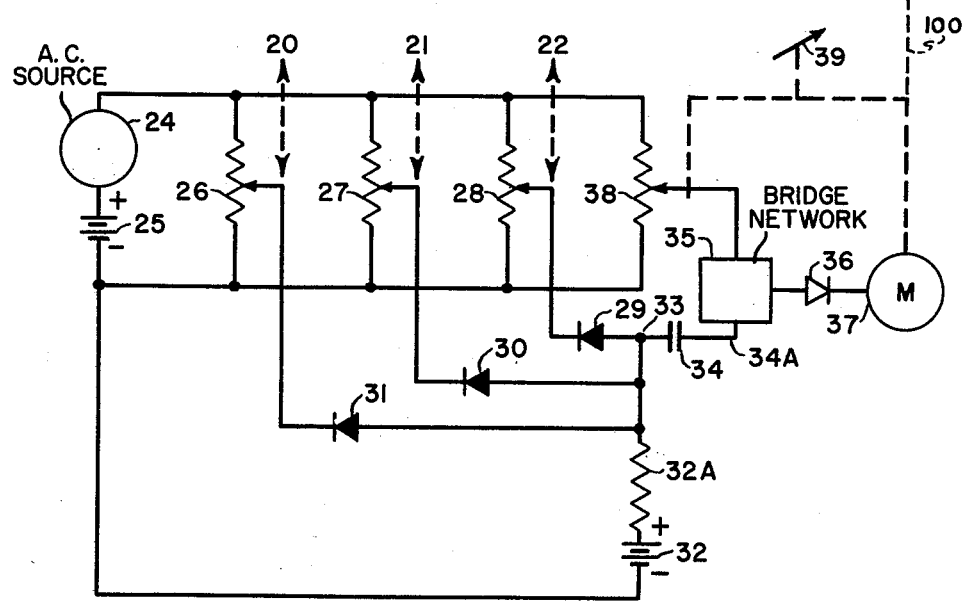
FIGURE 2 is a schematic diagram of a circuit embodying this invention to determine a minimum of a plurality of signals.

Referring now to FIGURE 1, a plurality of sensor signal inputs 1, 2, and 3 is shown by way of example for a scanning system. Although three sensor signal inputs are shown in FIGURES 1 and 2, it is to be understood that virtually an unlimited number of sensor inputs can be used in a scanning system. Potentiometers 6, 7 and 8 are mechanically coupled to sensor inputs 1, 2 and 3. The sensor signal input indicative of the parameter to be measured is determined by the position of the wipers of potentiometers 6, 7 and 8. Thus the electrical outputs of potentiometers 6, 7 and 8 reveal the amplitude of the parameters which sensor inputs 1, 2 and 3 are measuring or selecting. The wipers of potentiometers 6, 7 and 8 are connected electrically to diodes 11, 10 and 9 respectively as shown in FIGURE 1. A.C. voltage source 4 and D.C. voltage source 5 are connected to the potentiometers as shown in FIGURE 1. D.C. voltage source 12 is used to assure that one diode will always remain conductive. Resistor 12A maintains the diode current to a safe and reasonable level. The diodes 9, 10 and 11 are connected such that only one diode can be closed for operation in the conducting mode for a given set of input conditions. The diode which is in the conducting mode due to the first (D.C.) voltage source 5 therefore transmits the energy of the second (A.C.) voltage source 4 with negligible attenuation. It can be shown that the A.C. voltage at the anode of diode 9 must be equal to the maximum of the plurality of inputs. The signal coming through the conducting diode may then be measured and displayed by any of several conventional means.

One method of measurement and display provides an instrument servo as in FIGURE 1. The highest voltage which corresponds to the highest amplitude of input signals exists at point 13 with both D.C. and A.C. source energy being present there. Capacitor 14 blocks the energy of D.C. voltage source while allowing energy of the A.C. voltage source to be transmitted. The voltage which exists on conductor 14a is compared to the voltage that exists on the wiper of a rebalance potentiometer 18 by means of a bridge network 15. The difference is fed to amplifier 16, the output of which is used to drive motor 17. Potentiometer 18 is mechanically coupled to the output shaft of motor 17. The system is operatively connected as to drive itself to a null, as is well known in the art. At null the angular position of the wiper of potentiometer 18 is proportional to the magnitude of the signal on conductor 14a. The angular position of potentiometer 18 is displayed upon an indicator 19 for observation by the operator. The operator thereby reads the maximum of the input signals which are monitored by the scanning system and present as sensor inputs 1, 2 and 3. The indicating device described herein consists of bridge network 15, amplifier 16, rebalance potentiometer 18 and indicator 19, and is a typical instrument servo mechanism well known to those skilled in the art. This type of indicating system has found wide usage in the aircraft industry. Thus the maximatic system described is compatible with present existing equipment and requires a minimum of special circuitry.

In reference to FIGURE 2 a plurality of sensor signal inputs 21, 22 and 23 is shown by way of example. The signals from these sensor inputs exist at potentiometers 26, 27 and 28. A.C. voltage source 24 and D.C. voltage source 25 are connected to the potentiometers as shown in FIGURE 2. D.C. voltage source 32 is used to insure that one diode will always remain conductive. The resulting voltages on the wiper elements of potentiometers 26, 27 and 28 are applied respectively to diodes 29, 30 and 31 which are connected such that only one diode can operate in a conducting mode for a given set of input conditions. The other diodes must be in the non-conducting or open mode. The diode which is in the conducting mode due to the D.C. voltage source therefore transmits the energy of the A.C. voltage source with negligible attenuation. Both D.C. and A.C. voltage sources corresponding to the lowest input signal of sensor inputs 21, 22 and 23 exist at point 33. Capacitor 34 blocks the D.C. voltage source while allowing the energy of the A.C. signal source to be transmitted. On conductor 34a only the A.C. voltage source energy exists, corresponding to and representative of the lowest parameter which exists at any of the sensor inputs 21, 22 or 23. This signal on conductor 34a may be measured using a typical instrument servo mechanism as has been described previously. The typical instrument servo mechanism is comprised of bridge network 35, amplifier 36, motor 37, rebalance potentiometer 38 and indicator 39. It is thus shown that the minimum voltage selecting circuit is a variation of the maximum voltage selecting circuit shown previously. The operator is thus informed of the magnitude of the lowest input parameters monitored by the scanning system having sensor inputs 21, 22 and 23 by means of a direct reading indicator 39. It will be noted also that the motor 37, as shown, is arranged to actuate through a suitable shaft 100 a means 101 to initiate the alarm circuit.

In FIGURE 3 is shown a circuit which will derive the D.C. and A.C. voltage components from a sensor input which supplies only an A.C. signal input. The A.C. input is shown applied at 50. By means of transformer 51, diode 52 and condenser 53, a combination of A.C. and D.C. voltage outputs 54 is obtained. These outputs are used in place of potentiometer wipers shown in FIGURES 1 and 2.

In FIGURE 4 is shown a circuit which will derive the D.C. and A.C. voltage components from a sensor input which supplies only a D.C. signal input. A chopper 56 is used to convert the D.C. voltage which is fed through transformer 57 to generate the D.C. and A.C. voltage component output 58. These outputs are used to replace the potentiometer wipers which are shown in FIGURES 1 and 2. Either one of these input arrangements as shown in FIGURES 3 and 4 may be used wherever there is not available a sensor output of both A.C. and D.C. voltage.

In FIGURE 5 is shown a scanning and selection system which incorporates a non-servo type indicating system. The indicating system consists of an amplifier 60 and a meter 62. In the event a D.C. meter is used then a rectifier 61 is necessary as shown in FIG. 5. In the event an A.C. meter is used then the rectifier 61 can be eliminated. It should be noted in FIG. 5 that diodes 29, 30 and 31 are connected in a reversed manner from correspondingly connected diodes 29, 30 and 31 shown in FIG. 2. However, since power supplies 25 and 32 are also connected in a reverse manner from that shown in FIG. 5, the circuit still operates as a minimum voltage selection circuit as does the circuit in FIG. 2. The operation of the circuit will not be explained again since all components operate in a manner corresponding to the method and operation described in connection with FIG. 2. The components in FIG. 5 are identical to those in FIG. 2 with the exception of 60, 61 and 62 and their operation which has been explained herein. In FIGURE 1, reversing the connections of power supply 5 and reversing the connections of diodes 9, 10 and 11 will result in another system which selects the maximum sensor output. Although somewhat different in configuration its performance will be identical and hence there is no need to explain its operation in detail.

In FIGURE 6 is shown a variation of the basic electronic selection circuit which will allow it to perform a different and improved function. By means of a manually controlled potentiometer 85, the indicating device 87 may be made to read any specified value (or below 0) until one of the sensor inputs 71, 72, 73 indicates a parameter value which is either above or below a manual setting. This feature would be useful where the parameter indication is primarily to indicate a condition of imminent danger. By confining the indicating device to a specified point until this condition is reached, the operator's monitoring efforts can be considerably simplified. The operation of the circuit is as follows: The D.C. voltage source 74 is applied to the controlled potentiometer 85 in series with an A.C. source 83. (If it is desired that the indication read zero or below then the A.C. source 83 may be omitted.) The sensor inputs 71, 72 and 73 are mechanically coupled to wiper arms of potentiometers 76, 77 and 78 and move these wiper arms so that the electrical outputs of the potentiometers reveal the magnitudes of the parameters which they are monitoring. Thus the voltages appearing at 76, 77 and 78 comprise the D.C. and A.C. signal means proportional to the inputs of the respective sensors (not shown). The output voltages of the potentiometers 76, 77, 78 and 85 are applied to the diodes 79, 80, 81 and 82. The voltage output of potentiometer 85 consists of a fixed amplitude of A.C. voltage source 83 and a manually variable controlled potentiometer 85. FIGURE 6 is a minimum selection configuration and hence the indicating device will read the A.C. signal corresponding to the signal with the lowest value of D.C. signal. Hence the indicating device will always read an amount equal to the signal voltage of source 83 until one of the sensor inputs falls below the value of the manually controlled potentiometer 85. When one of the potentiometers falls below this value the indicating device 87 will then read the value of the input signal corresponding to that potentiometer.

The above description applies to a minimum selection circuit. The same ideas and principles can be embodied in a maximum selection circuit and then the indicator will read a specified amount until the sensors indicate an input having an amount above a manually controlled level.

The above circuit should find wide usage in applications where an alarm must be instituted by the indicating device when one of a plurality of inputs is greater or less than a desired value. The firing level of the alarm circuit may be readily controlled by the operator by adjustment of the manually controlled potentiometer. Since the indicating device will read zero until the sensor signal reaches the desired value, and the indicating device will read the actual value after this condition is reached, this circuit is easily adapted to operate an alarm switch (not shown) upon an indicating device.

The circuit configuration is somewhat similar to that of a standard OR circuit which is well known to those skilled in the electronic computer art. Such an OR circuit can be found in the literature. A full description of this OR circuit may be found on page 394 of textbook entitled, "Pulse and Digital Circuits" by Millman and Taub, published by McGraw-Hill, 1956.

Although the circuit is similar in some respects only to an OR configuration, the concept of dual frequency excitation and its utilization as a maximum or minimum selection circuit represents one of the novel features of this invention.

While specific embodiments of the present invention have been described, it is apparent that other modifications will occur to those skilled in the art, and it is to be understood that the specific embodiments are not presented by way of limitation but that the present invention comprehends all constructions coming within the scope of the appended claims.

I claim:

1. An electronic scanning and selection circuit comprising a series of at least two potentiometer means for individually receiving at least two input signals mechanically coupled to the adjustable tap of said potentiometer means, means connected to all of said potentiometer means for producing at a node a signal equal to the maximum signal of said individually received input signals, means for supplying both direct current and alternating currents to said potentiometer means and means for indicating the magnitude of said maximum input signal.

2. An electronic scanning and selection circuit comprising a series of at least two means for individually receiving at least two input signals mechanically coupled to an adjustable tap of said receiving means, means connected to each of said receiving means for producing a signal at a node equal to the minimum signal of said individually received input signals, means for supplying both direct current and alternating currents to said receiving means, and means for indicating the magnitude of said minimum input signal.

3. An electronic scanning and selection circuit comprising a plurality of electrical channels, means for supplying a D.C. and an A.C. voltage, means for individually receiving at least two input signals mechanically coupled to an adjustable connection of each of said channels and for applying each of said signals to one of said channels, means connected to said channels for rendering conductive one of said channels, exclusive to the others, to transmit selectively either the maximum or minium of said input signals and means for indicating the magnitude of said transmitted signal.

4. An electronic scanning and selection circuit according to claim 3 wherein the indicating means consists of a servo indicator.

5. An electronic selection circuit comprising a series of at least two signal means for individually receiving at least two input signals mechanically coupled to an adjustable connection on said signal means, means connected to each of said receiving means for producing at a node a signal equal to the maximum signal of said individually received input signals, means for supplying both direct and alternating currents, means for indicating the magnitude of said maximum input signal, and means for initiating an alarm circuit whenever any of the said input signals exceeds a preset value.

References Cited in the file of this patent

UNITED STATES PATENTS

| | | |
|---|---|---|
| 2,555,166 | Vehling | May 29, 1951 |
| 2,558,736 | Crews | July 3, 1951 |
| 2,614,163 | Roper | Oct. 14, 1952 |
| 2,762,997 | Boddy | Sept. 11, 1956 |
| 2,814,005 | Howell | Nov. 19, 1957 |
| 2,890,832 | Stone | June 16, 1959 |
| 2,964,708 | Steele | Dec. 13, 1960 |

FOREIGN PATENTS

| | | |
|---|---|---|
| 208,965 | Austria | May 10, 1960 |